(12) United States Patent
Okubo et al.

(10) Patent No.: US 10,176,654 B2
(45) Date of Patent: Jan. 8, 2019

(54) SUSPICIOUS PERSON DETECTION SYSTEM, SUSPICIOUS PERSON DETECTION METHOD

(71) Applicant: Recruit Co., Ltd., Tokyo (JP)

(72) Inventors: Kazunori Okubo, Tokyo (JP);
Ryuichiro Maezawa, Tokyo (JP);
Hironori Arakawa, Tokyo (JP)

(73) Assignee: Recruit Co., Ltd., Tokyo (JP)

( * ) Notice: Subject to any disclaimer, the term of this patent is extended or adjusted under 35 U.S.C. 154(b) by 0 days.

(21) Appl. No.: 15/769,419

(22) PCT Filed: Oct. 19, 2016

(86) PCT No.: PCT/JP2016/081001
§ 371 (c)(1),
(2) Date: Apr. 19, 2018

(87) PCT Pub. No.: WO2017/069166
PCT Pub. Date: Apr. 27, 2017

(65) Prior Publication Data
US 2018/0300974 A1 Oct. 18, 2018

(30) Foreign Application Priority Data
Oct. 20, 2015 (JP) ................................ 2015-206742

(51) Int. Cl.
*G07C 9/00* (2006.01)
*H04W 8/00* (2009.01)
(Continued)

(52) U.S. Cl.
CPC ......... *G07C 9/00119* (2013.01); *H04W 4/021* (2013.01); *H04W 8/005* (2013.01);
(Continued)

(58) Field of Classification Search
CPC ............ G06K 9/00221; G07C 9/00119; G07C 2209/08; H04W 4/021; H04W 8/005; H04W 48/08; H04W 12/08
(Continued)

(56) References Cited

U.S. PATENT DOCUMENTS 7,158,657 B2 * 1/2007 Okazaki ............. G06K 9/00221
382/118
2002/0176610 A1 11/2002 Okazaki et al.

FOREIGN PATENT DOCUMENTS

JP 2003099763 4/2003
JP 2006155435 6/2006
(Continued)

OTHER PUBLICATIONS

International Patent Application No. PCT/JP2016/081001, Written Opinion of the International Searching Authority, dated Nov. 15, 2016, 4 pages.
(Continued)

*Primary Examiner* — Ali Neyzari
(74) *Attorney, Agent, or Firm* — Morgan, Lewis & Bockius LLP

(57) ABSTRACT

A suspicious person detection technology which is less likely to cause a blind spot of detection of a suspicious person is provided. A suspicious person detection system detects a suspicious person present in a predetermined area and includes a probe request detection terminal (100) configured to detect a probe request transmitted from a mobile terminal (400) to generate probe information including first identification information specific to the mobile terminal which transmits the probe information, and an analyzing apparatus (200) configured to acquire the probe information from the probe request detection terminal, and, in the case where the first identification information included in the probe information matches none of one or more pieces of
(Continued)

second identification information set in advance, transmit suspicious person information indicating that a suspicious person is detected to a predetermined information processing apparatus (300).

6 Claims, 10 Drawing Sheets

(51) Int. Cl.
*H04W 4/021* (2018.01)
*H04W 48/08* (2009.01)
*G06K 9/00* (2006.01)
(52) U.S. Cl.
CPC ........ *H04W 48/08* (2013.01); *G06K 9/00221* (2013.01); *G07C 2209/08* (2013.01)
(58) Field of Classification Search
USPC .......................................... 340/5.61; 382/118
See application file for complete search history.

(56) References Cited

FOREIGN PATENT DOCUMENTS

| | | |
|---|---|---|
| JP | 2007172083 | 7/2007 |
| JP | 2009122938 | 6/2009 |
| JP | 2014026506 | 2/2014 |
| JP | 2014216677 | 11/2014 |
| JP | 2015138407 | 7/2015 |
| WO | 2007105295 | 9/2007 |

OTHER PUBLICATIONS

International Patent Application No. PCT/JP2016/081001, International Search Report, dated Nov. 15, 2016, 2 pages.

\* cited by examiner

Fig. 9

<WHITELIST>

| 1 | 12:34:56:78:9a:bc |
|---|---|
| 2 | 21:43:65:87:99:cb |
| 3 | 34:12:78:56:bc:9a |
|   | ⋮ |

SUSPICIOUS PERSON DETECTION SYSTEM, SUSPICIOUS PERSON DETECTION METHOD

CROSS-REFERENCE TO RELATED APPLICATION

The present application is based on Japanese Patent Application No. 2015-206742 filed on Oct. 20, 2015, the entire content of which is herein incorporated as reference.

TECHNICAL FIELD

The present invention relates to a technology for detecting a suspicious person present in a predetermined area.

BACKGROUND ART

As a technology for detecting a suspicious person who intrudes into a predetermined area such as a house, a condominium and office to be utilized for crime prevention, a crime-prevention system using a security camera is known (see, for example, Patent Literatures 1 and 2). In such a crime-prevention system, a suspicious person is detected by a person observing an image of the predetermined area photographed by, for example, the security camera, or image recognition processing being performed on the image.

By the way, with related art which uses a security camera, because it is necessary to provide a security camera and an apparatus which records or analyzes a photographed image, it is not easy to introduce the system. Further, a case can arise where a suspicious person cannot be detected because a blind spot of the security camera occurs. It is not preferable to increase the number of security cameras in order to avoid this inconvenience, because it makes a system configuration more complicated and increases cost, which makes introduction of the system further more difficult.

Patent Literature 1: Japanese Patent Laid-Open No. 2014-26506
Patent Literature 2: Japanese Patent Laid-Open No. 2015-138407

SUMMARY OF INVENTION

One object of the present invention is to provide a suspicious person detection technology which can be easily introduced and which is less likely to cause a blind spot in detection of a suspicious person.

A suspicious detection system according to one aspect of the present invention is a system for detecting a suspicious person present in a predetermined area, and includes (a) a probe request detection terminal configured to detect a probe request transmitted from a mobile terminal to generate probe information including first identification information specific to the mobile terminal which transmits the probe request, and (b) an analyzing apparatus configured to acquire the probe information from the probe request detection terminal and, in the case where the first identification information included in the probe information matches none of one or more pieces of second identification information set in advance, transmit suspicious person information indicating that the suspicious person is detected to a predetermined information processing apparatus.

A suspicious person detection method according to one aspect of the present invention is a method for detecting a suspicious person present in a predetermined area, and includes (a) a step of a first apparatus detecting a probe request transmitted from a mobile terminal to generate probe information including first identification information specific to the mobile terminal which transmits the probe request, and (b) a step of a second apparatus acquiring the probe information from the first apparatus, and, in the case where the first identification information included in the probe information matches none of one or more pieces of second identification information set in advance, transmitting suspicious person information indicating that the suspicious person is detected to a predetermined information processing apparatus.

Advantageous Effects of Invention

According to the above-described configuration, a suspicious person detection technology which can be easily introduced and which is less likely to cause a blind spot in detection of a suspicious person is provided.

BRIEF DESCRIPTION OF DRAWINGS

FIG. 9 is a diagram illustrating an example of a whitelist stored in a whitelist DB.

DESCRIPTION OF EMBODIMENT

Figure 1:
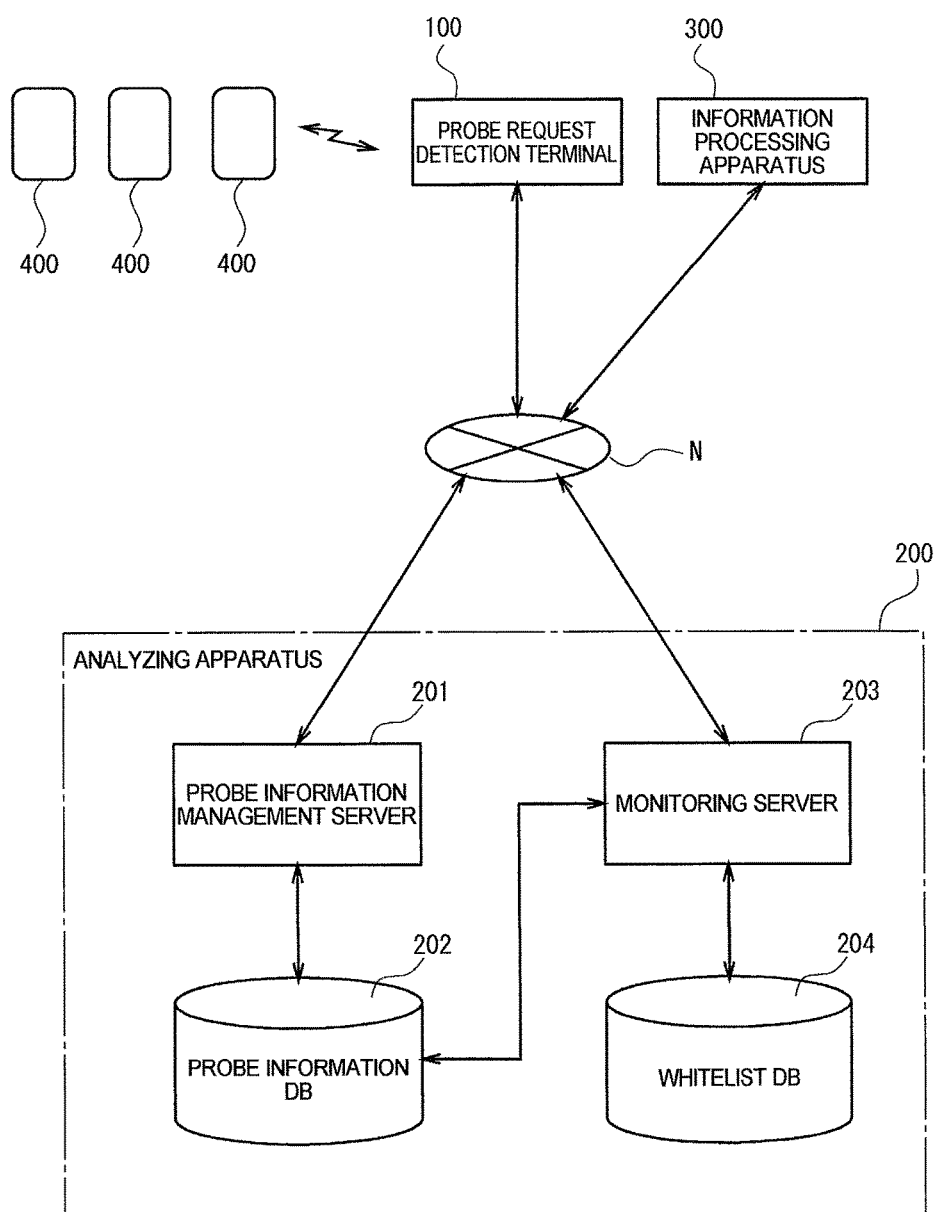
FIG. 1 is a diagram illustrating a schematic configuration of a suspicious person detection system according to an embodiment.

FIG. 1 is a diagram illustrating a schematic configuration of a suspicious person detection system according to an embodiment. As illustrated in FIG. 1, the suspicious person detection system includes a probe request detection terminal 100 provided in association with an area for which a suspicious person is to be detected, an analyzing apparatus 200 provided at a location different from a location of the probe request detection terminal 100, and an information processing apparatus 300 which, in the case where a suspicious person is detected in the above-described predetermined area, receives and displays information indicating that the suspicious person is detected (suspicious person information). The probe request detection terminal 100, the analyzing apparatus 200 and the information processing apparatus 300 are connected to each other via a communication network N so that they can perform information communication. Note that the probe request detection terminal 100 corresponds to a "first apparatus", and the analyzing apparatus 200 corresponds to a "second apparatus".

The suspicious person detection system according to the present embodiment detects whether or not there is a suspicious person in a predetermined area with which the probe request detection terminal 100 is associated by the probe request detection terminal 100 detecting a mobile terminal 400 which has a wireless LAN function (Wifi function) based on Wifi (Wireless Fidelity) standards and the analyzing apparatus 200 analyzing the detection result. Note that, it is assumed in the present embodiment that a suspicious person carries the mobile terminal 400.

The probe request detection terminal 100 is directed to detecting each mobile terminal 400 located within an area such as, for example, a house, a condominium and office, for which a user of the system desires to detect presence of a suspicious person, and is provided at a predetermined location (for example, a location nearly in the center of the area) within the area. The probe request detection terminal 100 includes, for example, a small PC (Personal Computer), a Wifi module, a power source, an external storage apparatus (an SD card and a USB memory), or the like.

The analyzing apparatus 200, which detects whether or not there is a suspicious person within the area by analyzing information transmitted from the probe request detection terminal 100, includes a probe information management server 201, a probe information database (DB) 202, a monitoring server 203 and a whitelist database (DB) 204. The analyzing apparatus 200 is configured with, for example, a computer with high arithmetic processing capacity, and is configured by a predetermined program for server being executed at the computer.

The communication network N includes a communication network which enables the probe request detection terminal 100, the analyzing apparatus 200 and the information processing apparatus 300 to perform information communication with each other. The communication network N may be, for example, one of the Internet, a LAN, a lease line, a telephone line, an intranet, a mobile communication network, Bluetooth, Wifi, other communication lines, combination thereof, or the like, and may be either a wired network or a wireless network.

The information processing apparatus 300 can receive various kinds of information and display content of the various kinds of information and can transmit information input by the user using an operating unit to outside. As such an information processing apparatus, for example, a typical personal computer, a mobile terminal such as a smartphone and a tablet type computer, or the like, can be used. Here, as an example, it is assumed that the information processing apparatus 300 is a smartphone in which predetermined application software (so-called app) is installed. The information processing apparatus 300 is possessed by an owner or a manager of an area for which a suspicious person is to be detected, and is used for, when a suspicious information is detected in the area, receiving suspicious person information indicating that the suspicious person is detected.

A plurality of mobile terminals 400 are carried by users (such as, for example, dwellers and employees) who are allowed to go in and out the predetermined area, or carried by suspicious persons who are not allowed to go in and out the predetermined area, and includes a Wifi function for performing wireless communication via an access point (AP), or the like, which is not illustrated. In the present embodiment, while a smartphone is assumed as the mobile terminal 400, the present invention can be applied to any terminal having a Wifi function, such as a mobile phone, a PHS, a personal computer (PC), a notebook (PC), a personal digital assistance (PDA), and a video game console. Note that the mobile terminal 400 possessed by one of users who are allowed to go in and out the predetermined area may be also used as the information processing apparatus 300 described above.

Figure 2:
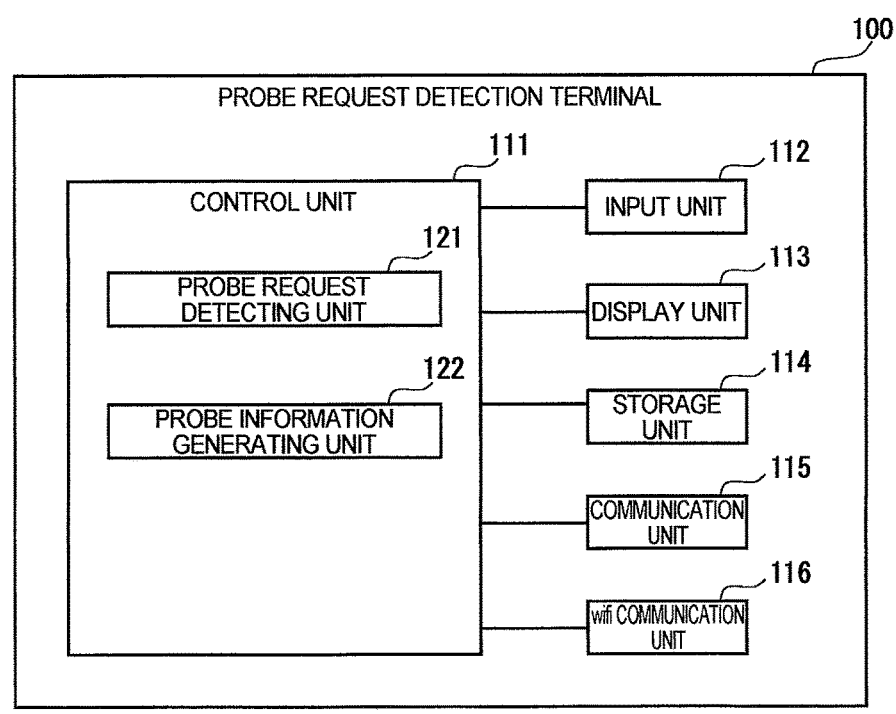
FIG. 2 is a block diagram illustrating a functional configuration of a probe request detection terminal.

FIG. 2 is a block diagram illustrating a functional configuration of the probe request detection terminal. As illustrated, the probe request detection terminal 100 includes a control unit 111, an input unit 112, a display unit 113, a storage unit 114, a communication unit 115 and a wifi communication unit 116.

The control unit 111, which is configured by a predetermined operation program being executed at a computer system including, for example, a CPU, a ROM, a RAM, or the like, includes a probe request detecting unit 121 and a probe information generating unit 122 as functional blocks.

The input unit 112, which is, for example, input means such as a keyboard connected to the control unit 111, is used for inputting various kinds of information. The display unit 113, which is, for example, display means such as a liquid crystal display panel connected to the control unit 111, displays various kinds of images. The storage unit 114, which is storage means such as a hard disk apparatus connected to the control unit ill, stores an operation program to be executed at the control unit 111 and various kinds of data.

The communication unit 114 is connected to the control unit 111 and performs processing relating to information communication with the analyzing apparatus 200. The wifi communication unit 116 performs processing relating to information communication with each mobile terminal 400.

The probe request detecting unit 121 detects a probe request which is regularly broadcasted (simultaneously transmitted) by each mobile terminal 400 to look for an access point. The probe request is received via the wifi communication unit 116.

The probe information generating unit 122 generates probe information including terminal address information, or the like, which is information for specifying the mobile terminal 400 which detects the probe request. The generated probe information is transmitted to the analyzing apparatus 200 via the communication unit 115.

Figure 3:
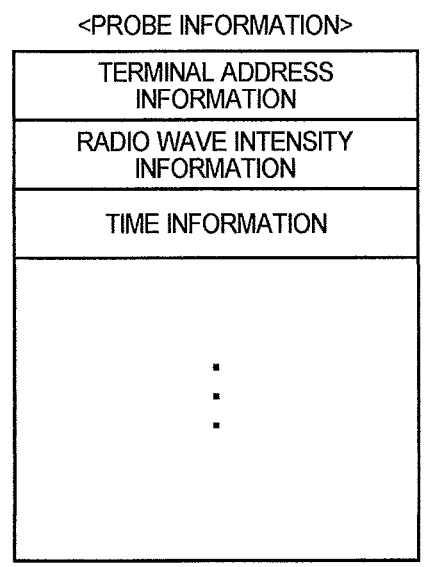
FIG. 3 is a diagram illustrating an example of content of probe information.

FIG. 3 is a diagram illustrating an example of content of the probe information. As illustrated in FIG. 3, the probe information includes "terminal address information (MAC address)" which is information for identifying each mobile terminal 400 detected by the probe request detection terminal 100, "radio wave intensity information" which is information indicating intensity of a radio wave emitted from each mobile terminal 400, "time information" which is information indicating time at which a probe request from each mobile terminal 400 is detected, or the like.

Figure 4:
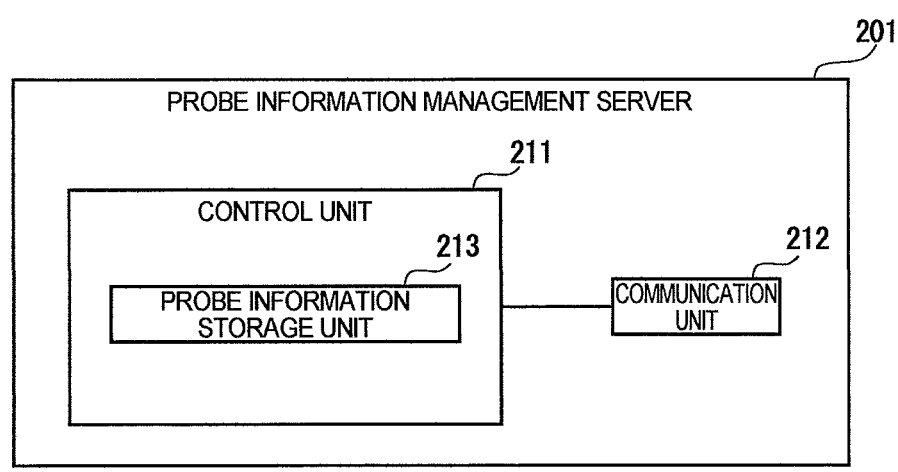
FIG. 4 is a block diagram illustrating a configuration of a probe information management server which constitutes an analyzing apparatus.

FIG. 4 is a block diagram illustrating a configuration of a probe information management server which constitutes the analyzing apparatus. The probe information management server 201, which manages probe information transmitted from the probe request detection terminal 100, includes a control unit 211, a communication processing unit 212, an input unit and a display unit which are not illustrated, or the like.

The control unit 211, which is configured by a predetermined operation program being executed at a computer system including, for example, a CPU, a ROM, a RAM, or the like, includes a probe information storage unit 213 as a functional block. The communication unit 212 is connected to the control unit 211 and performs processing relating to information communication with the probe request detection terminal 100.

The probe information storage unit 213 performs processing of storing probe information which is transmitted from the probe request detection terminal 100 and received via the communication unit 212 in the probe information DB 202 (see FIG. 1).

Figure 5:
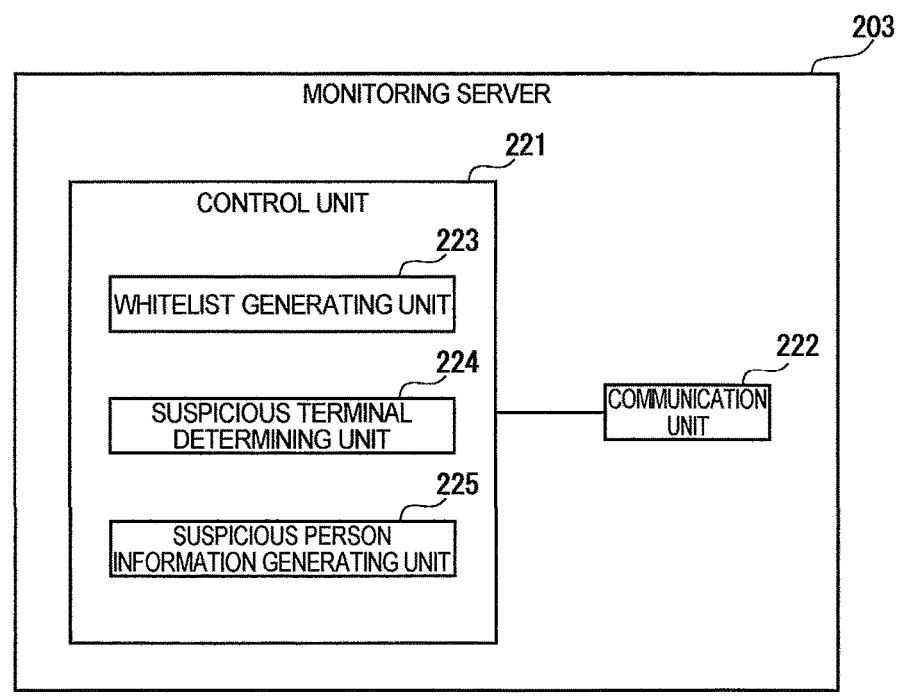
FIG. 5 is a block diagram illustrating a configuration of a monitoring server which constitutes the analyzing apparatus.

FIG. 5 is a block diagram illustrating a configuration of a monitoring server which constitutes the analyzing apparatus. The monitoring server 203, which performs processing of detecting whether or not there is a suspicious person in a predetermined area on the basis of the probe information stored in the probe information DB 202 and generating and transmitting suspicious person information which is information indicating that a suspicious person is detected, includes a control unit 221, a communication processing unit 222, an input unit and a display unit which are not illustrated, or the like.

The control unit 221, which is configured by a predetermined operation program being executed at a computer system including, for example, a CPU, a ROM, a RAM, or the like, includes a whitelist generating unit 223, a suspicious terminal determining unit 224, a suspicious person information generating unit 225 as functional blocks. The communication unit 222 is connected to the control unit 221 and performs processing relating to information communication with the information processing apparatus 300.

The whitelist generating unit 223 generates a whitelist which is a list including one or more pieces of terminal address information of the mobile terminals 400 carried by users who are allowed to go in and out the predetermined area. The generated whitelist is stored in the whitelist DB 204 (see FIG. 1).

The suspicious terminal determining unit 224 acquires the probe information which is transmitted from the probe request detection terminal 100 and stored in the probe information DB 202, and determines whether or not terminal address information (first identification information) included in the probe information matches one of one or more pieces of terminal address information (second identification information) included in the whitelist stored in the whitelist DB 204. Then, in the case where there is terminal address information which matches none of the terminal address information included in the whitelist, the suspicious terminal determining unit 224 determines that there is a suspicious terminal which is the mobile terminal 400 carried by a person presumed to be a suspicious person, and hands over information indicating that there is a suspicious terminal and probe information such as terminal address information corresponding to the suspicious terminal to the suspicious person information generating unit 225.

The suspicious person information generating unit 225 generates suspicious person information indicating that a suspicious person is detected using the information indicating that there is a suspicious terminal, the terminal address information, or the like, relating to the suspicious terminal, acquired from the suspicious terminal determining unit 224. The suspicious person information is transmitted to the information processing apparatus 300 via the communication unit 222.

Figure 6:
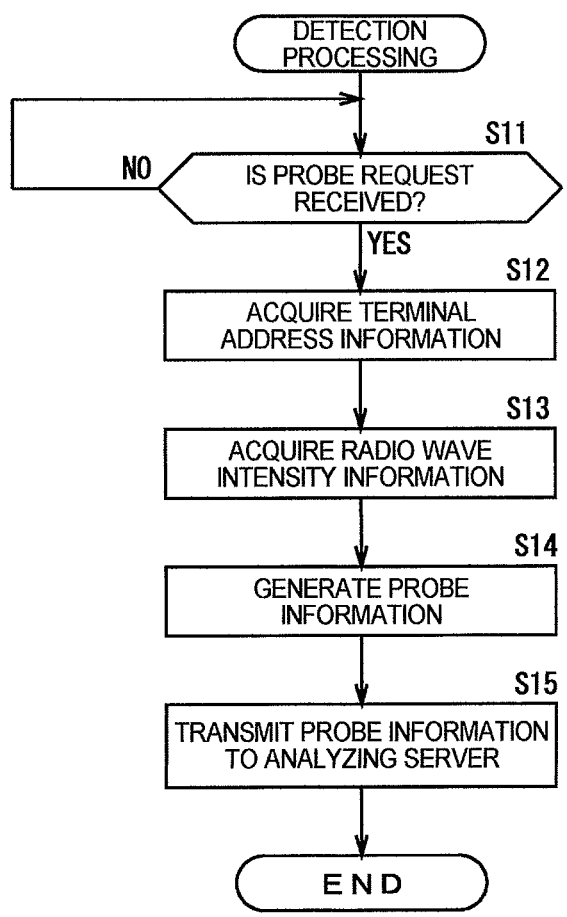
FIG. 6 is a flowchart illustrating operation procedure of the probe request detection terminal.

FIG. 6 is a flow chart illustrating operation procedure of the probe request detection terminal.

The probe request detecting unit 121 of the probe request detection terminal 100 determines whether or not a probe request from the mobile terminal 400 located in the neighborhood is received by the wifi communication unit 116 (step S11). The processing in step S11 is repeated until a probe request is received (step S11: No). Note that, it is assumed that each mobile terminal 400 regularly broadcasts a probe request to look for an access point to which the mobile terminal 400 can be connected.

If a probe request is received (step S11: Yes), the probe request detecting unit 121 acquires terminal address information included in the probe request (step S12) and acquires radio wave intensity information indicating intensity of a radio wave emitted by the mobile terminal 400 which transmits the probe request from the wifi communication unit 116 (step S13).

Subsequently, the probe information generating unit 122 generates probe information including "terminal address information" of the detected mobile terminal 400, "radio wave intensity information" and "time information" indicating time at which the probe request from the mobile terminal 400 is detected (step S14). The probe information is transmitted to the analyzing apparatus 200 via the communication unit 115 (step S15).

Figure 7:
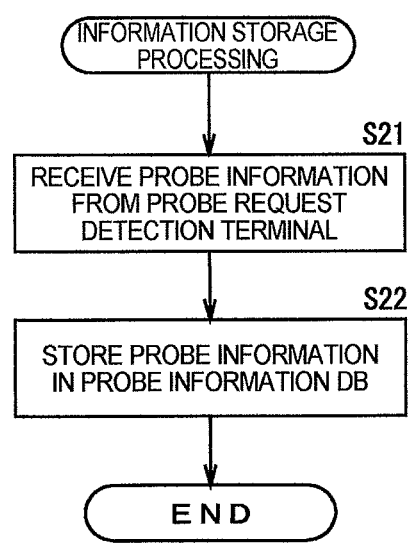
FIG. 7 is a flowchart illustrating operation procedure of the probe information management server.

FIG. 7 is a flowchart illustrating operation procedure of the probe information management server.

The probe information storage unit 213 of the probe information management server 201 receives the probe information transmitted from the probe request detection terminal 100 via the communication unit 212 (step S21).

Subsequently, the probe information storage unit 213 stores the received probe information in the probe information DB 202 (step S22). The probe information is stored in the probe information DB 202, for example, in chronological order.

Figure 8:
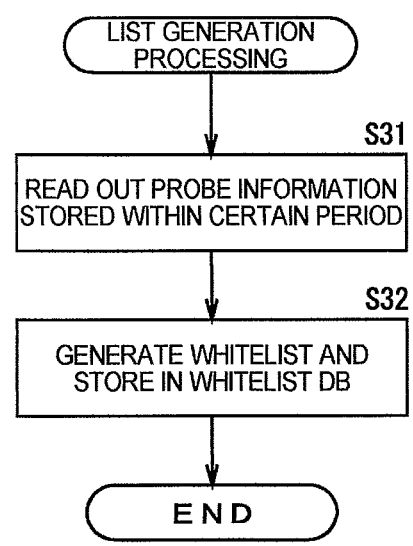
FIG. 8 is a flowchart illustrating operation procedure at the monitoring server when a whitelist is generated.

FIG. 8 is a flowchart illustrating operation procedure at the monitoring server when a whitelist is generated.

The whitelist generating unit 223 of the monitoring server 203 reads out the probe information stored within a certain period from the probe information DB (step S31). The certain period described here can be, for example, a period until a period set in advance (for example, several minutes to several hours) has elapsed since the suspicious person detection system has been provided. Further, for example, it is also possible to set the certain period by the user designating an arbitrary period using the information processing apparatus 300 and the designated period being transmitted to the monitoring server 203.

Note that storage time of probe information may be determined on the basis of time information included in the probe information or may be determined on the basis of information indicating time of storage which is added when the probe information storage unit 213 stores the probe information in the probe information DB 202.

Subsequently, the whitelist generating unit 223 generates a whitelist on the basis of the read probe information and stores the probe information in the whitelist DB 204 (step S32).

Here, the whitelist can be generated by, for example extracting all terminal address information included in probe information stored within a certain period and so as to include all the terminal address information. In this case, it is preferable to set a relatively short certain period and dispose the respective mobile terminals 400 of the users who are allowed to go in and out the predetermined area near the probe request detection terminal 100 so that probe requests can be received within the period.

Further, the whitelist may be generated by extracting terminal address information corresponding to the mobile terminal 400 for which probe requests are detected the number of times equal to or larger than a predetermined number of times (for example, more than once) within the certain period and so as to include the terminal address information, because, in the case where probe requests are received a plurality of times within the certain period, the user who carries the mobile terminal 400 is highly likely to be allowed to go in and out the predetermined area. In this case, it is preferable to set a relatively long certain period (for example, several hours to several days).

Further, the whitelist may be generated by extracting terminal address information corresponding to the mobile terminal 400 which issues a probe request at radio wave intensity greater than a predetermined threshold with reference to radio wave intensity information included in probe information and so as to include the terminal address information, because great radio wave intensity means a short distance between the probe request detection terminal 100 and each mobile terminal 400, and such a mobile terminal 400 is highly likely to be carried by a user who is allowed to go in and out the predetermined area. In this manner, according to the suspicious person detection system of the present embodiment, it is possible to further extract a mobile terminal which issues a probe request at "radio wave intensity greater than a predetermined threshold" at the analyzing apparatus 200 among the probe information generated from probe requests which are not detected as noise at the probe request detection terminal 100. By this means, it is possible to more reliably identify the mobile terminals 400 carried by the users who are allowed to go in and out the predetermined area.

FIG. 9 is a diagram illustrating an example of the whitelist stored in the whitelist DB. The terminal address information (for example, "12:34:56:78:9a") is stored in the whitelist DB 204, for example, in association with index information (1, 2, 3, . . . in the illustrated example).

Figure 10:
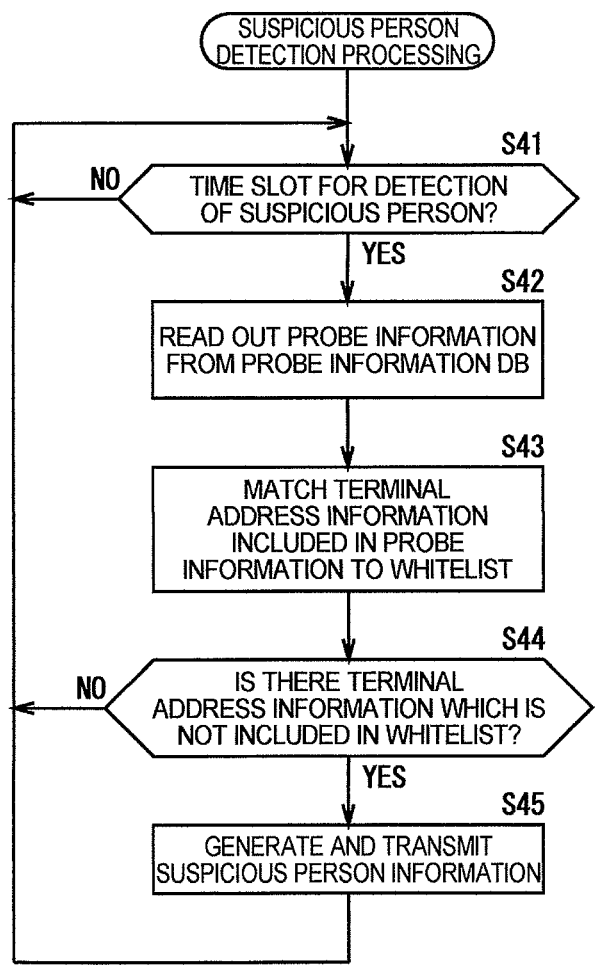
FIG. 10 is a flowchart illustrating operation procedure at the monitoring server when a suspicious person is detected.

FIG. 10 is a flowchart illustrating operation procedure at the monitoring server when a suspicious person is detected.

The suspicious terminal determining unit 224 determines whether or not current time is included in a time slot set for detection of a suspicious person (step S41). In the case where the current time is not a time slot for detection of a suspicious person (step S41: No), the processing does not transition to step S42.

Note that, as the time slot in step S41, an arbitrary time slot such as night-time (for example, from 18:00 to 5:00 in the next morning) and entire days of holidays is set in advance. Further, this time slot may be set by the user using, for example, the information processing apparatus 300.

In the case where the current time is included in the time slot set for detection of a suspicious person (step S41: Yes), the suspicious terminal determining unit 224 reads out probe information stored in the probe information DB 202 (step S42). Here, it is preferable to read out only probe information after the time slot for detection of a suspicious person is started.

The suspicious terminal determining unit 224 then matches the terminal address information included in the read probe information to the terminal address information included in the whitelist stored in the whitelist DB 204 (step S43), and determines whether or not there is terminal address information which does not match the terminal address information included in the whitelist (step S44).

In the case where there is no terminal address information which does not match the terminal address information included in the whitelist (step S44: No), the processing returns to the above-described step S41, and processing after step S41 is repeated until the time slot for detection of a suspicious person has elapsed.

In the case where there is terminal address information which does not match the terminal address information included in the whitelist (step S44: Yes), the suspicious terminal determining unit 224 hands over information indicating that there is a suspicious terminal and probe information such as terminal address information corresponding to the suspicious terminal to the suspicious person information generating unit 225.

The suspicious person information generating unit 225 generates suspicious person information on the basis of the information acquired from the suspicious terminal determining unit 224 and transmits the suspicious person information to the information processing apparatus 300 via the communication unit 212 (step S45). Content included in the transmitted suspicious person information is displayed at a display unit of the information processing apparatus 300. The user who sees this information can know that a suspicious person is detected. Then, the processing returns to the above-described step S41, and the processing after step S41 is repeated until the time slot for detection of a suspicious person has elapsed.

Here, it is only necessary that the suspicious person information includes at least information indicating that a suspicious person is detected in the predetermined area, and it is preferable that the suspicious person information further includes detailed information such as terminal address information corresponding to the suspicious terminal carried by the suspicious person and time information included in the probe information of the suspicious terminal (that is, information indicating time at which the suspicious terminal is detected).

According to the embodiment as described above, because it is only necessary to provide a probe request detection terminal so as to correspond to the predetermined area on the user side, a suspicious person detection system which can be easily introduced is provided. Further, because it is only necessary that a probe request can be received with a radio wave, a suspicious person detection system in which a blind spot of detection of a suspicious person is less likely to occur compared to a case where a security camera is used, is provided.

Note that the present invention is not limited to the above-described embodiment and can be implemented in various other forms within a scope not deviating from the gist of the present invention. Therefore, the above-described embodiment is merely an example in all aspects and should not be interpreted in a limited way. For example, while, in the above-described embodiment, a whitelist is generated using probe information which is stored in the probe information DB 202 within a certain period, it is also possible to generate a whitelist by directly specifying terminal address information using the information processing apparatus 300, or the like.

REFERENCE SIGNS LIST

100: probe request detection terminal
111: control unit
112: input unit
113: display unit
114: storage unit
115: communication unit
116: wifi communication unit
121: probe request detecting unit
122: probe information generating unit
200: analyzing apparatus
201: probe information management server
202: probe information database
203: monitoring server
204: whitelist database 211: control unit
212: communication unit
213: probe information storage unit
221: control unit
222: communication unit
223: whitelist generating unit
224: suspicious terminal determining unit
225: suspicious person information generating unit
300: information processing apparatus
400: mobile terminal

The invention claimed is:

1. A suspicious person detection system for detecting a suspicious person present in a predetermined area, the suspicious person detection system comprising:
   a probe request detection terminal configured to detect a probe request transmitted from a mobile terminal to generate probe information including first identification information specific to the mobile terminal which transmits the probe request and radio wave intensity information indicating radio wave intensity of the probe request; and
   an analyzing apparatus configured to acquire the probe information from the probe request detection terminal, generate second identification information by extracting a terminal address corresponding to a mobile terminal for which a probe request is detected at radio wave intensity greater than a predetermined threshold, and in the case where the first identification information included in the acquired probe information matches none of one or more pieces of second identification information set in advance, transmit suspicious person information indicating that the suspicious person is detected to a predetermined information processing apparatus.

2. The suspicious person detection system according to claim 1,
   wherein the analyzing apparatus generates the second identification information by extracting terminal address information corresponding to a mobile terminal for which probe requests are detected a plurality of times within a certain period.

3. The suspicious person detection system according to claim 1,
   wherein the analyzing apparatus transmits the suspicious person information to the information processing apparatus in the case where the first identification information is acquired in a time slot set in advance.

4. The suspicious person detection system according to claim 1,
   wherein each of the first identification information and the second identification information is terminal address information.

5. A suspicious person detection method for detecting a suspicious person present in a predetermined area, the suspicious person detection method comprising:
   a step of a first apparatus detecting a probe request transmitted from a mobile terminal to generate probe information including first identification information specific to the mobile terminal which transmits the probe request and radio wave intensity information indicating radio wave intensity of the probe request; and
   a step of a second apparatus acquiring the probe information from the first apparatus, generating second identification information by extracting a terminal address corresponding to a mobile terminal for which a probe request is detected at radio wave intensity greater than a predetermined threshold, and, in the case where the first identification information included in the acquired probe information matches none of one or more pieces of second identification information set in advance, transmitting suspicious person information indicating that the suspicious person is detected to a predetermined information processing apparatus.

6. The suspicious person detection system according to claim 2,
   wherein the analyzing apparatus transmits the suspicious person information to the information processing apparatus in the case where the first identification information is acquired in a time slot set in advance.

* * * * *